(No Model.)
C. A. LORD.
TROLLEY CATCHER.
No. 498,355. Patented May 30, 1893.
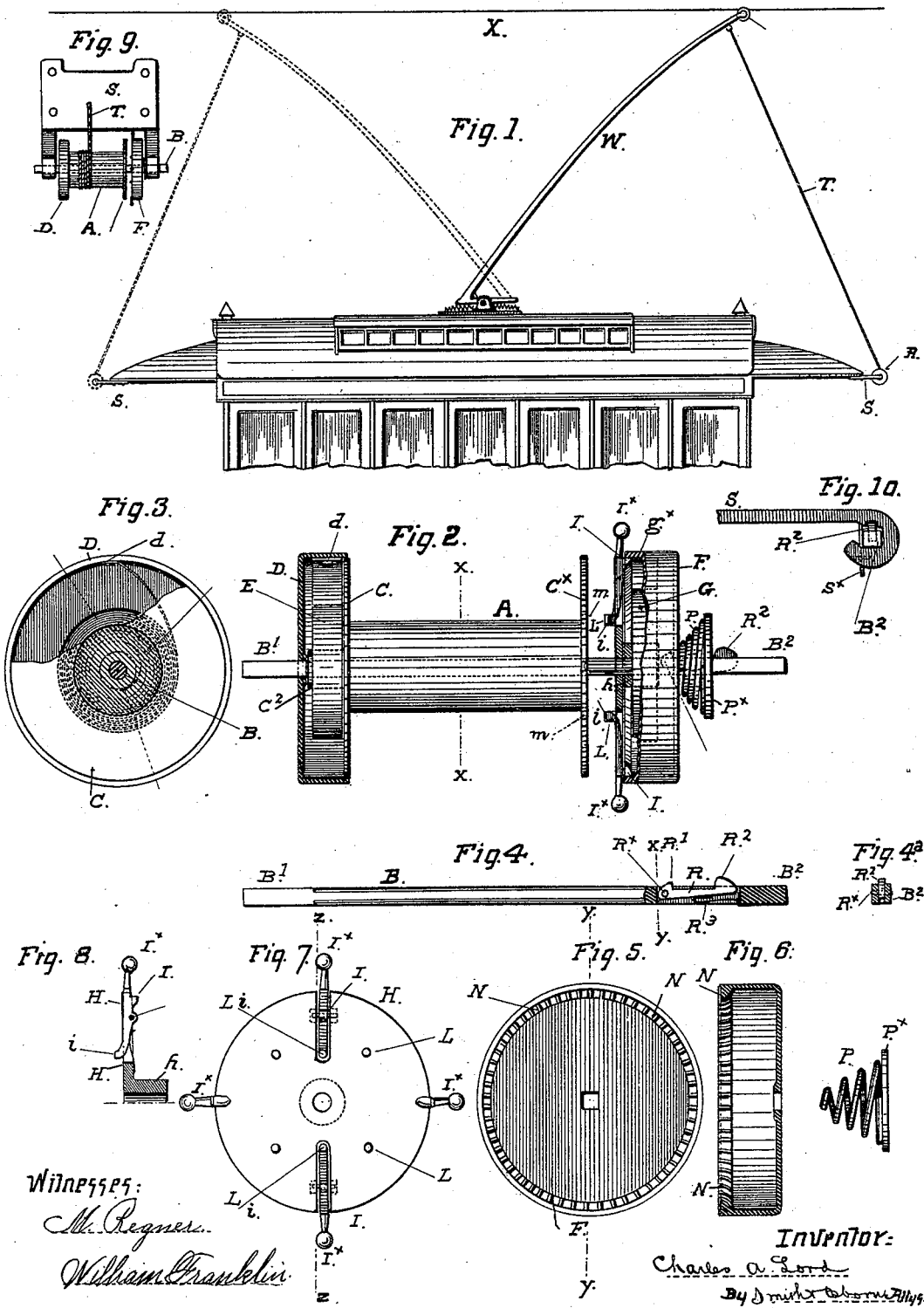
Witnesses:
M. Regner
William Franklin
Inventor:
Charles A. Lord
By Smith Osborn Attys.

UNITED STATES PATENT OFFICE.

CHARLES A. LORD, OF SAN FRANCISCO, CALIFORNIA, ASSIGNOR OF ONE-HALF TO T. A. KIRKPATRICK, OF SAME PLACE.

TROLLEY-CATCHER.

SPECIFICATION forming part of Letters Patent No. 498,355, dated May 30, 1893.

Application filed July 12, 1892. Serial No. 439,772. (No model.)

*To all whom it may concern:*

Be it known that I, CHARLES A. LORD, a citizen of the United States, residing in the city and county of San Francisco, State of California, have invented an Improved Trolley-Rope Check and Trolley-Pole Controller for Electric Cars, of which the following is a specification.

My invention has for its object mainly to provide a device or attachment for general use on electric-roads of the over-head conductor plan or system to control the trolley-pole and prevent injury to the conducting-wire or its supports as well as to the pole itself whenever the trolley flies off or leaves the wire.

To such end and object the invention consists of a rope-reel of novel construction which is adapted to take up the slack of the trolley-rope and keep it in a state of tension without drawing the trolley away from the wire under the inequalities of the track, and in combination therewith a supplemental or auxiliary winding power which is normally out of engagement with the reel but which is applied to the reel whenever the trolley jumps or leaves the conducting-wire, and when so applied it acts to wind up the trolley-rope on the reel and thereby draw down the trolley-pole closely to the car.

The following description explains the nature of my said invention and the manner in which I proceed to construct and produce a device or attachment in accordance with my invention, for the purpose described; reference being had to the drawings that accompany and form part of this specification.

Figure 1 represents my invention applied to the trolley-rope on an electric car of ordinary construction; and it shows the over-head conducting wire, the trolley-pole and its rope and the top-portion of the car in side elevation. Fig. 2 is a view of the reel removed from its support on the car, with portions broken away and in section to show the construction more clearly. Fig. 3 is a cross-section at $x\,x$ Fig. 2 showing in front view the spring-barrel on the left side of that line. Fig. 4 shows the axle removed from the reel and one end in section. Fig. $4^a$ is a cross-section at $x\,y$ Fig. 4. Fig. 5 is a view of the barrel on the right-hand of the line $x\,x$ with the spring removed. Fig. 6 is a cross-section through the same on the vertical center line $y\,y$ Fig. 5. Fig. 7 is a front view of the winding disk that forms part of the spring-barrel and also a clutch to connect the barrel to the spool. Fig. 8 is a one-half vertical cross-section through this disk on the line $z\,z$ Fig. 7. Fig. 9 is a top-view on a reduced scale of the bracket or support on the car; and Fig. 10 is a side-view on an enlarged scale of the outer end-portion of the bracket and the socket for the axle at that end.

A is a spool fitted loosely to turn on an axle B, and C $C^\times$ are circular disks of metal forming the heads of the spool. The axle has squared portions B′ B² at the ends and the remaining portion between the ends is rounded for the spool to turn on.

D is a drum or barrel fixed on the squared part B′ of the shaft with a deep rim in which the head C of the spool is fitted to turn, and E is a coil-spring having one end secured to a hub C² on the disk C and the other end attached in like manner to the barrel at $d$. The barrel is fixed on the square portion B$^\times$ of the axle, and consequently the power of the spring E is exerted on the spool. The trolley-rope is laid on the spool in several turns and is kept taut by the force of the spring under all ordinary movements of the pole produced by inequalities in the track. The spring is regulated to keep the rope about taut and yet allow the pole to rise and fall under any irregularities in the track without leaving the conducting-wire.

F is a drum or barrel on the opposite end of the axle also stationary with reference to any rotative movement, but capable of sliding longitudinally to a limited extent on the square portion B² of the shaft toward and away from the head C$^\times$ of the spool. A coil spring G in this barrel F is attached at one end to the rim of the barrel at $g^\times$ and at the opposite end to the hub $h^\times$ of a circular plate or disk H setting into the rim of the barrel and turning loosely on the axle.

I are spring pawls or dogs on the disk H engaging with a circle of ratchet teeth or pins N N in the rim of the barrel, and L L are clutch pins or stops projecting from the outer face of the plate H and taking into recesses in the face of the head C<sup>×</sup> of the spool when the plate is thrown forward and against that end of the spool.

Holes or recesses at $m\ m$ Fig. 2 are made in the face of the spool head C<sup>×</sup> at proper distance from the axis to receive the pins of the clutch disk H. The pawls I are pivoted in slots in the disk H and their lower ends $i$ set out beyond the face of the disk as shown in Figs. 2, 7, and 8.

Under ordinary conditions of adjustment when the trolley is running properly on the conducting-wire the barrel F containing the spring G is held back out of engagement; but whenever a sudden or extraordinary strain is brought upon the trolley-rope it is caused to throw the barrel F with its clutch disk against the head of the reel, and by such movement the disk H is locked to the head C<sup>×</sup> by the clutch-pins L, and thus the power of the spring G is added to wind up the rope. The head of the spool is brought against the ends of the pawls at such time with sufficient pressure to throw out the pawls from the teeth N, and the disk H is released from the barrel and the spring G is free to act. The power of this spring is sufficient to draw down the trolley-pole. To hold this power out of action and to throw it into action by a sudden strong pull or any excessive strain on the trolley-rope, I have employed with good results the construction shown in Figs. 3 and 4, consisting of a spiral spring P at the back of the barrel F acting to press it forward against the head C<sup>×</sup> of the spool, and a pivoted latch R set in a slot in the axle to hold back the barrel against the re-action of the spring P.

A stationary plate or collar P<sup>×</sup>, fastened on the square portion of the axle forms a bearing for the base of the spring P, and the forward end of the spring sets against the back of the barrel F. The latch is pivoted at R<sup>×</sup> in a slot in the axle, and has a tooth or latch-portion R' that projects on the inside of the barrel in front of the hub or opening through which the axle passes, while the outer end of the latch terminates in a projecting portion R<sup>3</sup>, also standing beyond the axle, for depressing the latch. A spring R<sup>3</sup> under the latch holds it in position for action.

The bracket or support S to carry the reel is fixed at the end of the car-roof in any suitable position which will keep the rope from chafing, and both ends of the car are provided with a bracket in those cases of application and use where the trolley-pole requires to be reversed in switching the car from the track to another or turning the car end for end. These two positions of the trolley-pole are represented by the full lines and the dotted lines in Fig. 1.

When the reel is placed in its bracket or support on the car the square portions B' B<sup>2</sup> at the ends of the axle set into bearings of corresponding shape to keep the axle from turning, and the bearing for the end B<sup>2</sup> where the latch is located is properly shaped to let in the projecting part R<sup>2</sup> of the latch as well as the axle, and this part R<sup>2</sup> rests directly against the top of the bearing or socket as shown in Fig. 10. In this position the latch R' will hold back the barrel F as long as the reel receives an ordinary amount of tension or pulling force of the trolley-rope, but under extraordinary pull or strain, such as would result when the trolley flies off the conducting-wire, the latch R<sup>2</sup> will be depressed by the sudden upward movement of the axle and thus release the barrel F. At such movement the barrel is thrown into engagement with the spool and the power of the spring G is thrown upon the reel to draw down the pole.

The sockets have openings at one side for setting in and taking out the axle, and a bolt or keeper S<sup>×</sup> serves to confine the ends of the axle in the sockets and to allow the reel to be readily unshipped, either for winding up the spring G after its force has been expended, or for removing the reel from the bracket to shift it from one end to the other of the car. The spokes or knobs I<sup>×</sup> on the rim of the disk H are provided for the purpose of winding up the spring.

In the present construction I have applied four of these knobs to the disk at points equidistant on the edge, and two of them are fixed on the ends of the pawls I or are extensions of the outer ends of the pawls. I do not confine myself however to this particular construction of winding means, nor to the number and arrangement of pawls before described, and shown in the drawings, as the number may be greater or less according to the strength of the spring employed.

When this device is applied for operation the end of the trolley-rope is permanently attached to the spool and is then laid in as many turns as is found necessary to take up the slack and give light tension on the rope, and at such time also the spring barrel F is to be wound and set up for action.

To handle and set the trolley-pole as well as to shift it from one end of the car to the other the reel is unshipped from the bracket and held in the hands.

As thus constructed and applied the device is almost instantaneous in its action, as the trolley-rope is kept always in a state of tension and in condition to respond to the movement of the reel when the spring-barrel F begins to act.

Having thus fully described my invention, what I claim as new, and desire to secure by Letters Patent, is—

1. A trolley-rope attachment consisting of a reel to which the rope is attached, a support for said reel on the car, a spring acting on the reel to take up the slack and hold the rope in tension, a supplementary-spring normally out of engagement with the reel, but supplying the necessary power to wind up the rope, and mechanism actuated or set in motion by the strain or pull of the rope, as described, and throwing said spring into the reel to wind up the rope, substantially as set forth.

2. In a trolley-rope attachment, the combination, of a spring-reel adapted to take up the slack and hold the rope in tension, a barrel containing a supplementary-spring supplying the necessary power to wind up the rope, a clutch adapted to lock the spring barrel and spring-reel together, and mechanism applied to hold the spring-barrel out of action under ordinary strain or tension of the rope, and actuated by an excessive strain or pull of the rope on the reel to lock the spring-barrel to the reel, substantially as described.

3. In a trolley-rope attachment the combination, of a reel to which the rope is attached, a tension-spring holding the rope in tension, and a stationary-support on the car having open bearings that allow the reel to be unshipped and removed, substantially as described.

4. The combination, of the reel A C C$^x$ loose on a stationary axle, the main-spring E attached to the reel, the supplementary spring-power consisting of the sliding barrel F rotating disk H spring G one or more pawls I $i$ clutch-pins L adapted to lock the disk to the reel, and the spring P and latch R, applied to operate as set forth.

In testimony that I claim the foregoing I have hereunto set my hand and seal.

CHAS. A. LORD. [L. S.]

Witnesses:
 CHAS. E. KELLEY,
 EDWARD E. OSBORN.